US009952995B2

(12) United States Patent
Rahamim et al.

(10) Patent No.: US 9,952,995 B2
(45) Date of Patent: Apr. 24, 2018

(54) REDUNDANT PACKET FORWARDING SYSTEM

(71) Applicants: Hezi Rahamim, Ramat Gan (IL); Amir Yosha, Rishon Le Zion (IL)

(72) Inventors: Hezi Rahamim, Ramat Gan (IL); Amir Yosha, Rishon Le Zion (IL)

(73) Assignee: NXP USA, Inc., Austin, TX (US)

( * ) Notice: Subject to any disclaimer, the term of this patent is extended or adjusted under 35 U.S.C. 154(b) by 434 days.

(21) Appl. No.: 14/441,188

(22) PCT Filed: Nov. 27, 2012

(86) PCT No.: PCT/IB2012/056766
§ 371 (c)(1),
(2) Date: May 7, 2015

(87) PCT Pub. No.: WO2014/083381
PCT Pub. Date: Jun. 5, 2014

(65) Prior Publication Data
US 2015/0293871 A1    Oct. 15, 2015

(51) Int. Cl.
*G06F 13/40* (2006.01)
*H04L 12/437* (2006.01)
(Continued)

(52) U.S. Cl.
CPC .......... *G06F 13/4022* (2013.01); *G06F 13/24* (2013.01); *G06F 13/4221* (2013.01); *H04L 12/437* (2013.01); *H04L 69/40* (2013.01)

(58) Field of Classification Search
CPC .. G06F 13/4022; G06F 13/24; G06F 13/4221; H04L 12/437; H04L 69/40
See application file for complete search history.

(56) References Cited

U.S. PATENT DOCUMENTS

| 6,912,196 B1 * | 6/2005 | Mahalingaiah ....... H04L 12/437 370/216 |
| 2006/0245454 A1 * | 11/2006 | Balasubramanian . H04J 3/0673 370/509 |

(Continued)

OTHER PUBLICATIONS

Gunnar Prytz et al., "Redundant and Synchronized EtherCAT Network". International Embedded Systems, 2010 International Symposium, Jul. 7-9, 2010, pp. 201-204.*

(Continued)

*Primary Examiner* — Henry Tsai
*Assistant Examiner* — John Roche (57) ABSTRACT

A master device has a slave port and a redundant slave port for communicating with slaves according to a network protocol, e.g. EtherCAT, via data packets including a circulating bit. The slaves are arranged in a sequence starting at the slave port, and are connected via a communication medium. A respective slave in the sequence detects whether the connection to its processing receiver is lost, and, if so, internally transfers any data packets from its forwarding arrangement to its processing arrangement, while setting the circulating bit. The master device has a switcher unit coupled to the redundant slave port and a last slave in the sequence. The switcher unit transfers data packets from the switcher receiver to the switcher transmitter, and detects whether a circulating bit is set. If so, the unit switches off said transferring and switches on a connection between the redundant slave port and the switcher for transferring replicated packets to the sequence. Advantageously, the system enables hot plug-in and also distributed clock synchronization, and reduces the processing requirements of the master device.

14 Claims, 6 Drawing Sheets

(51) Int. Cl.
H04L 29/14 (2006.01)
G06F 13/24 (2006.01)
G06F 13/42 (2006.01)

(56) References Cited

U.S. PATENT DOCUMENTS

2010/0088442 A1    4/2010   Kuschke
2010/0168877 A1    7/2010   Begey et al.
2010/0241773 A1*   9/2010   Rostan .................. H04L 12/403
                                                      710/110
2010/0254369 A1   10/2010   Tao et al.
2011/0029687 A1    2/2011   Kirrmann et al.
2011/0205886 A1    8/2011   Maruyama et al.
2012/0076146 A1    5/2012   Rohatschek et al.
2014/0047056 A1    2/2014   Tahara et al.

OTHER PUBLICATIONS

Prytz Gunnar et al: "Redundant and Synchronized EtherCAT Network", Industrial Embedded Systems (SIES), 2010 International Symposium, Jul. 7-9, 2010, pp. 201-204.
International Search Report and Written Opinion correlating to PCT/IB2012/056766 dated Nov. 27, 2012.

* cited by examiner

REDUNDANT PACKET FORWARDING SYSTEM

FIELD OF THE INVENTION

This invention relates to electronic communication devices, such as master and slave packet forwarding devices, coupled via a network interface, and a method of communicating. More specifically, the invention is in the field redundant forwarding of packets.

In the field of computer networking, redundant forwarding, is a switching method for packet switching systems in which a network has a topology that enable a packet to reach a destination via a least two different routes. The use of redundant forwarding is an important feature of packet orientated automation systems. Furthermore, the implementation of such systems is expanding in the industrial market, and the technique is increasingly finding its way into solutions for the home, medical, networking and automotive applications. For example, such applications might include, by way of example, Ethernet protocols such as EtherCAT (Ethernet for Control Automation Technology), ProfiNET, IEC62439, DLR (Device Level Ring) or redundant forwarding for IP traffic.

BACKGROUND OF THE INVENTION

The document by Gunnar Prytz and Jonny Skaalvik "Redundant and Synchronized EtherCAT Network"; IEEE Embedded Systems (SIES) 978-1-4244-5841-7/10, 2010 describes redundant EtherCAT networks. A master having two embed slaves was suggested by Prytz. There are two effects of integrating two slaves in the master: The master may share the same HW clock with the embedded slaves, i.e. providing a reference clock. Furthermore, redundant network topologies are available, in particular a ring topology starting at the first embedded slave and terminating at the second embedded slave, so as to have a closed loop connection, via the sequence of slaves, from the first embedded slave to the second embedded slave, as shown in the left part of FIG. 2 of Prytz. When a connection in the ring is broken, two independent subsequences remain, each connected to a respective embedded slave, as shown in the right part of FIG. 2 of Prytz. Hence communication from the master to any of the slave in the sequence is still available.

However, the suggested schema in the above publication will not be able to support both redundancy and Distributed Clock (DC) synchronization without a major effort in the master side

SUMMARY OF THE INVENTION

The present invention provides an electronic device, and a method, as described in the accompanying claims.

Specific embodiments of the invention are set forth in the dependent claims. Aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings.

Elements in the figures are illustrated for simplicity and clarity and have not necessarily been drawn to scale. In the Figures, elements which correspond to elements already described may have the same reference numerals.

DETAILED DESCRIPTION OF THE PREFERRED EMBODIMENTS

Figure 1:
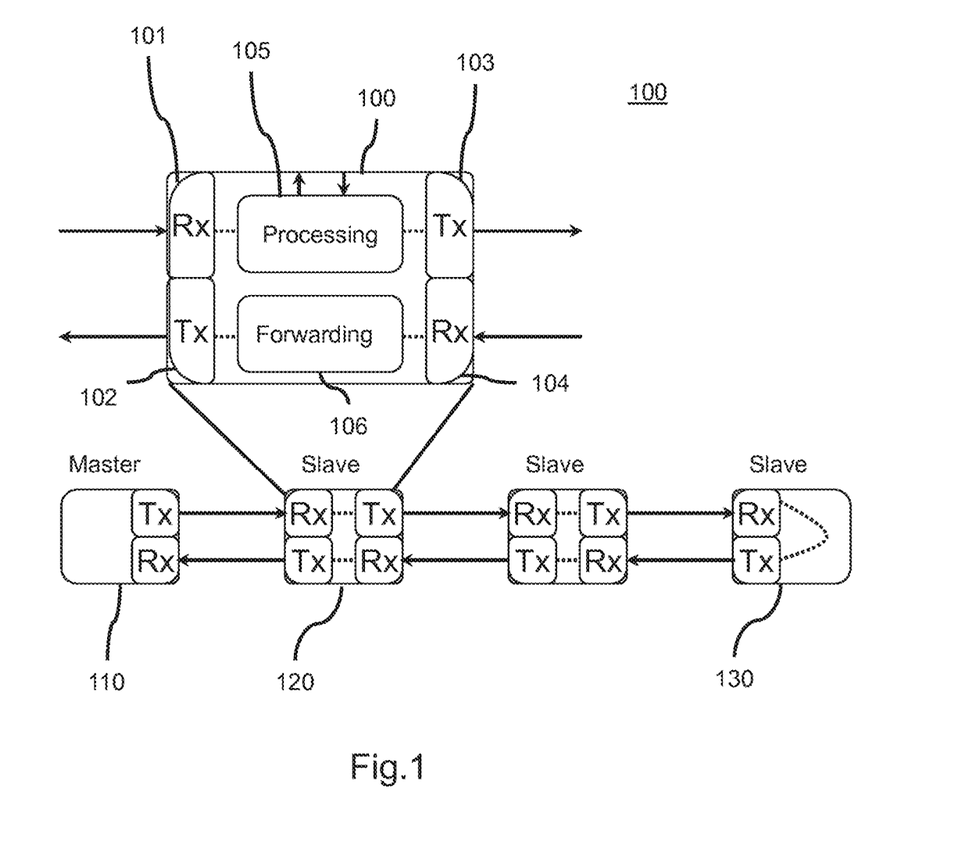
FIG. 1 shows an example of a network for data communication.

FIG. 1 shows an example of a network for data communication. The Figure shows in a network 100, a master device 110 and a sequence of slave devices 120 up to a last slave device 130. A first slave 120 is shows in detail, having a processing section 105 coupled to a processing receiver Rx 101 and a processing transmitter Tx 103, together forming a processing arrangement. The slave also has a forwarding section 106 coupled to a forwarding receiver Rx 104 and a forwarding transmitter Tx 102, together forming a forwarding arrangement. In the network, the master is controlling the system; the master creates data frames and sends the frames through the network. The frames sent by the master control the slave functionalities, such as Digital IO, Analog IO, Servo control etc . . . . Frames are processed on the fly, and a frame may be processed on multiple slaves at same time.

In the network 100 the master node 110 is coupled via a master port to a first slave, and transmits data packets in an upstream direction to a sequence of slave nodes. The master also comprises a receiver unit Rx which receives a flow of downstream data frames from the chain of slaves. The slaves are coupled in a chain and the last slave node 503 is a node for terminating the chain of slave nodes. Slave 120, shown in detail in the upper part of the Figure, enables an upstream data path (left to right in the Figure). The slave nodes have a second, downstream data path similar to the upstream data path, which enables such nodes to handle a bidirectional data stream. The master has a single transmitter TX and receiver Rx, and does not forward received frames. The terminating slave node 130 may have a single transmitter TX and receiver Rx. Alternatively, the terminating slave may be equal to the other slaves, and have its (processing) Tx transmitter coupled to its (forwarding) Rx receiver. Further devices may have three or more receiver/transmitter pairs and corresponding forwarding units for enabling more complex network architectures. So the slaves are arranged for connection via a communication medium in a sequence starting at a slave port of a master device The slaves receive the upstream data frames on their upstream receiver unit Rx from a previous node in the chain. The upstream transmitter unit transmits the data frame to a subsequent node in the chain. The upstream of data packets may be monitored by an application processing thread in a processor and data which is relevant for the specific slave node is processed by an application processing unit. If the application processing unit wants to transmit data to other nodes, it may insert data into specific locations of the upstream data packets which are forwarded by the slave node from the upstream receiver unit to the upstream transmitter unit, and ultimately arrive at the master. Slave nodes usually do not generate data packets/frames themselves and only use the predetermined portions of the data packet or portions of the data packet that are calculated as results of decoding a command header within a data packet to transmit data to other units. The master unit 110 is, in the example of FIG. 1, the only node in the network 100 which generates new data packets/frames.

The slaves have also a downstream reception unit Rx at which they receive data frames from the subsequent node in the sequence. The data packets of the received data frames are, without being inspected, forwarded to the downstream transmitter unit for transmission of the data frames to the previous node in the chain of nodes, as also indicated in the downstream data path.

Figure 2:
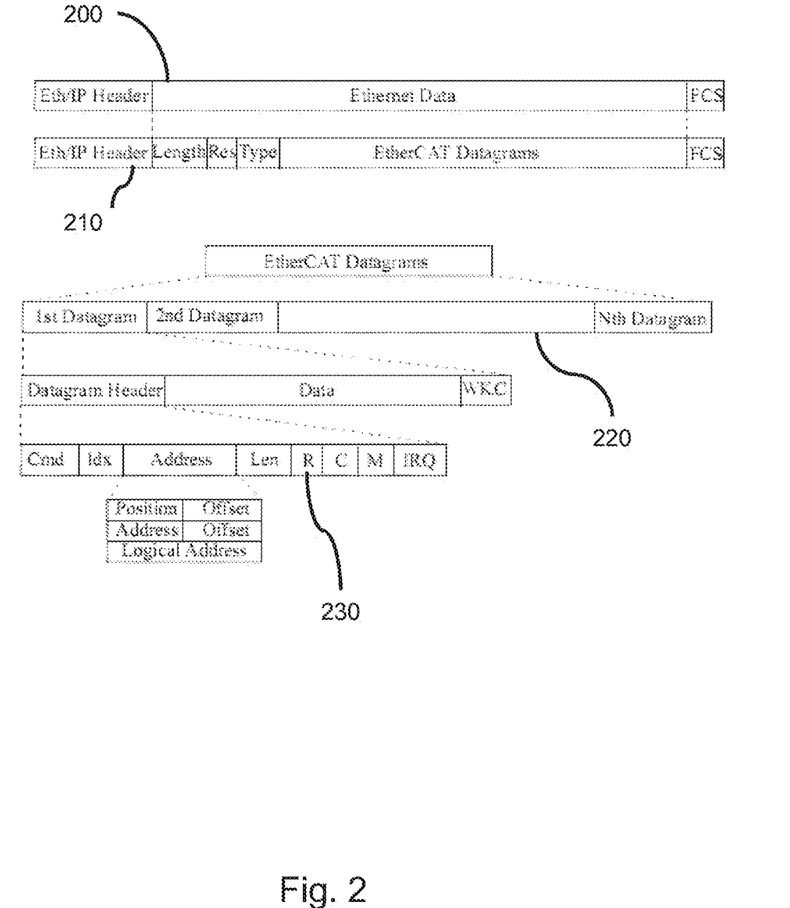
FIG. 2 shows an example of data packets.

FIG. 2 shows an example of data packets. A first data packet 200 is shows having Ethernet Data, preceded by an Ethernet/IP header and terminated by a frame check sum FCS. A second packet 210 has the structure of an EtherCAT Datagram, having additional parameters Length, Res and Type that define the data packet. In a further example a series of EtherCAT Datagrams 220 is shown. The datagrams have a datagram header 230, which stores control data. In particular, control data in such data packets may include a circulating bit. So the network protocol defines data packets having data bytes having a predetermined structure including a circulating bit. In practice, data frames may be prefixed with a preamble which is used by the physical layer to synchronize a receiving device with the transmitting device. The data frame further comprises the data packet after the preamble. The data packet comprises the actual data of the data frame.

Figure 3:
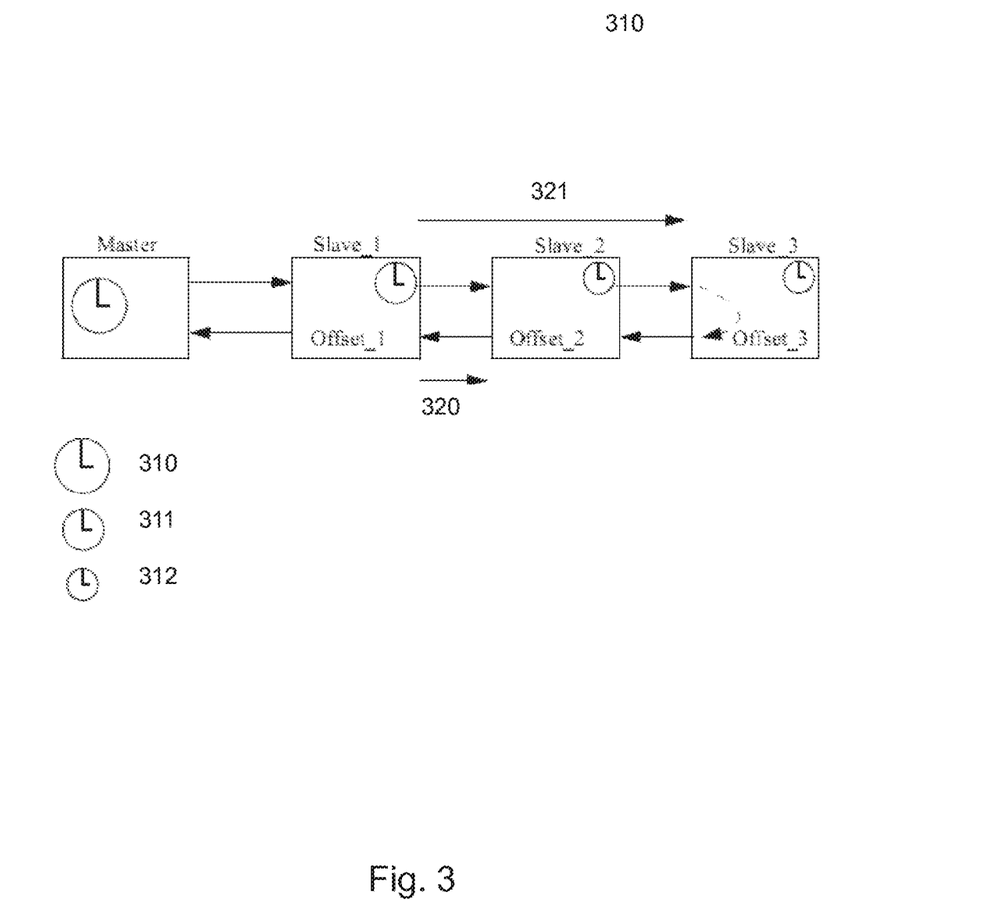
FIG. 3 shows an example of distributed clock synchronization.

FIG. 3 shows an example of distributed clock synchronization. A master device is coupled to a sequence of a first slave Slave_1, a second slave Slave_2 and a third slave Slave_3. The master has a Master Clock 310, for example according to IEEE 1588, or based on signals of the GPS system. The first slave has a reference clock 311, which is based on a Local Clock of Slave_1 and an offset Offset_1. The further slaves Slave_2, Slave_3 have respective further clocks 312, that are respectively based on a Local Clock of Slave_i and an offset Offset_i.

In the example all the slaves are capable to provide distributed clock synchronization for synchronizing respective networking clocks in respective slave and master devices in the network. Synchronization between the clock is performed by determining a first propagation delay 320 between Slave_1 and Slave_2, and a second propagation delay 321 between Slave_1 and Slave_3. As such, distributed clock synchronization is known in the EtherCAT system, and further examples are given later.

In FIG. 1, the topology of the network 100 is illustrative for the EtherCAT system which may be used to communicate information in a control automation technology, such as the control of a factory production line. The EtherCAT system allows the effective use of the bandwidth of the Ethernet system. The master device is a network device for communicating with other such devices according to a network protocol via a communication medium. The network protocol defines the communication, including data packets comprising data bytes having a predetermined structure including a packet header, e.g. the EtherCAT protocol.

An example of a known slave device is described in the document: "Hardware Data Sheet EtherCAT ET1100 Slave Controller, Version 1.6, Date: 2009 Aug. 28, by Beckhoff". The document also describes the known network protocol EtherCAT, in particular reference is made to chapters 1, 2 and 3.

In the above mentioned document by Prytz, and in the following description EtherCAT is used as an example system of a network enabling a sequence of slaves to be coupled to a master device via a main slave port and also via a further, redundant slave port. However, it is noted that any provision described in the current document for EtherCAT may similarly be applied in other networks.

When an EtherCAT system is connected in a redundant topology and there is a failure in one of the EtherCAT slaves some slaves in the network may be disconnected from the master. The enhancements described below will enable the system, in the case of failure, disconnect or hot-plug-in, the other slaves in the sequence to remain connected and synchronized to the master, and coupled to all the slaves in the network except the one which failed or was disconnected.

Ethernet based industrial protocols such as EtherCAT become more and more dominant on the industrial market. The redundant topologies are a key element of the industrial systems as they guaranty a high availability of the industrial network. The method described here enables the EtherCAT master to remain connected to all the EtherCAT slaves except the failing one and thus realizes a redundant EtherCAT network. Moreover, using this method all the EtherCAT slave clocks may stay synchronized even after the failure occurred. This method also enables a hot connect of further slaves, also after a failure.

In the prior art document by Prytz, an EtherCAT master device is implemented with two integrated EtherCAT slave nodes (A and H in the FIG. 2 of Prytz). The EtherCAT network is arranged into a ring topology, with the EtherCAT master sending duplicate data packets in each direction around the ring (via each of the integrated slave nodes A and H). When a break occurs in the network, two independent networks are created with each network receiving a version of the (duplicated) data packets. There are several problems with the prior art system.

First distributed clock (DC) synchronization requires 'out-and-back' transmission of a special packet sent by the master (called the ARMW command) in order for the necessary propagation delay measurements to be obtained. Thereto a sequence of slaves must have a terminating slave. The special packet is sent during DC synchronization, and the return of said packet via the sequence is detected. Hence, in the prior art, the master device would have to close one of its ports to effectively 'break' the ring every synchronization update cycle. Subsequently the master has to re-open the port to revert back to the ring topology. So every DC update cycle requires changes of the network topology. Hence, the prior art enables hot connect, which is the ability of the user to connect a new slave to the system on runtime. However, the prior art DC synchronization will not work properly.

Secondly, the requirement for the master device to duplicate every packet and transmit the original and duplicated packet in two directions around the ring via two ports requires additional processing cycles and complexity, which may result in jitter into the transmission of data packets. In the current system duplication will occur only when there is a failure, and the switcher unit is in transferring mode. The switcher unit may be an embedded slave unit coupled between the redundant port of the master device and the last slave in the sequence. The embedded slave is adapted to perform said transferring, detecting and switching.

Whereas the Prytz prior art would require a major change in the master, the current system is able to utilize a regular redundant master. The change could be implemented in a dedicated switcher unit, which may be included in an enhanced slave or in a slave embedded din the master device. The switcher is to be positioned between the last slave of a sequence and the redundant slave port of the master. Initially, when the sequence is operating normally, the switcher transfers received packets to its forwarding transmitter. However, when it detects a circulating bit in a received packet, the slave establishes the link to the redundant slave port of the master, and now transfers any packets to and from the master redundant slave port.

Figure 4:
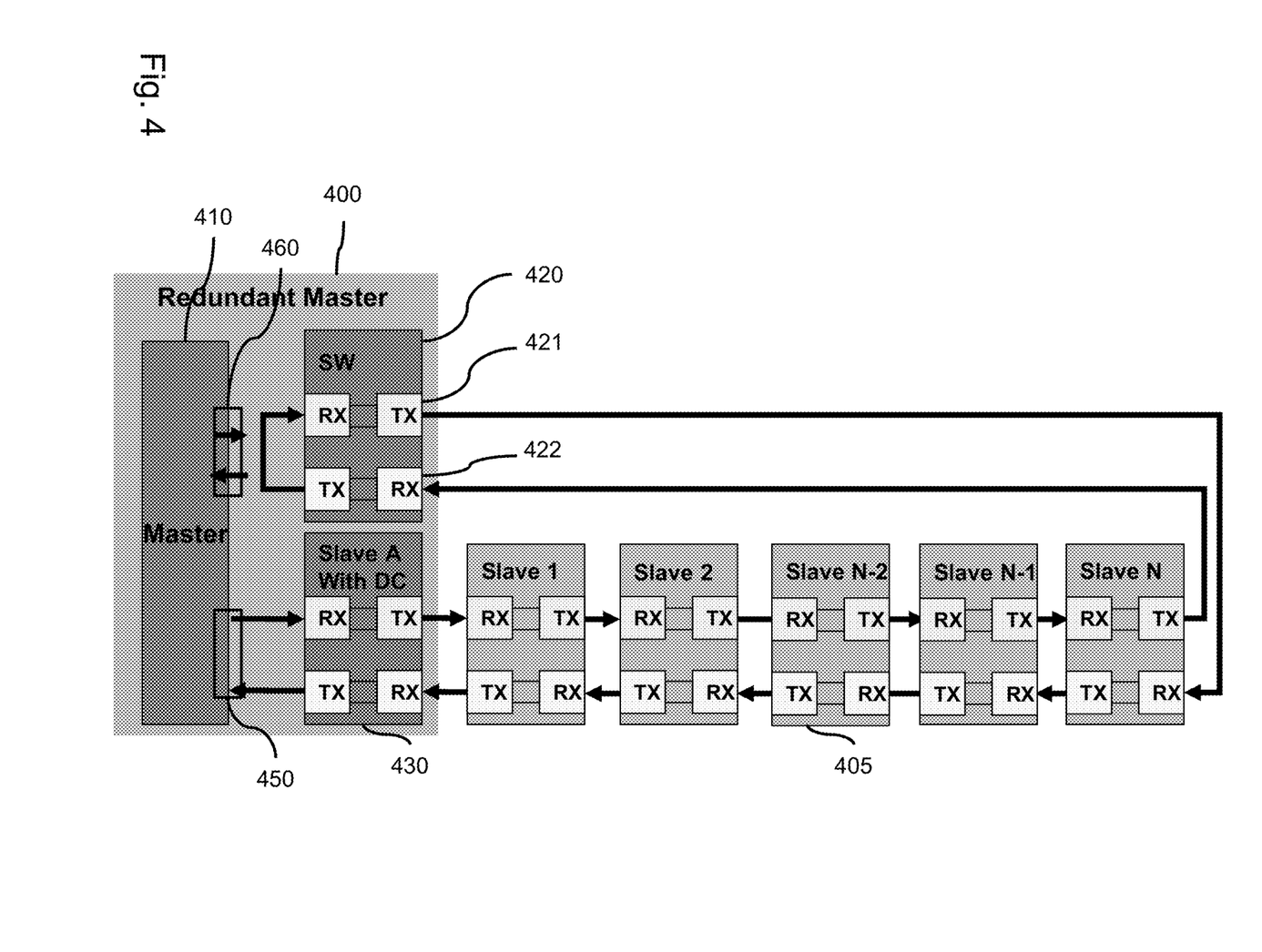
FIG. 4 shows an example of network having a redundant master and a switcher unit in terminating mode.

FIG. 4 shows an example of network having a redundant master and a switcher unit in terminating mode. A redundant master device 400 has a master unit 410. The electronic master device 400 has a master unit 410 having a slave port 450 and a redundant slave port 460 for communicating with slaves according to a network protocol. The network protocol defines data packets comprising data bytes having a predetermined structure including a circulating bit. The slave are coupled to a sequence 405 via a communication medium, e.g an Ethernet cables. The sequence starts at the slave port of the master device. The redundant slave port is arranged for replicating packets that are transferred via the slave port.

Figure 5:
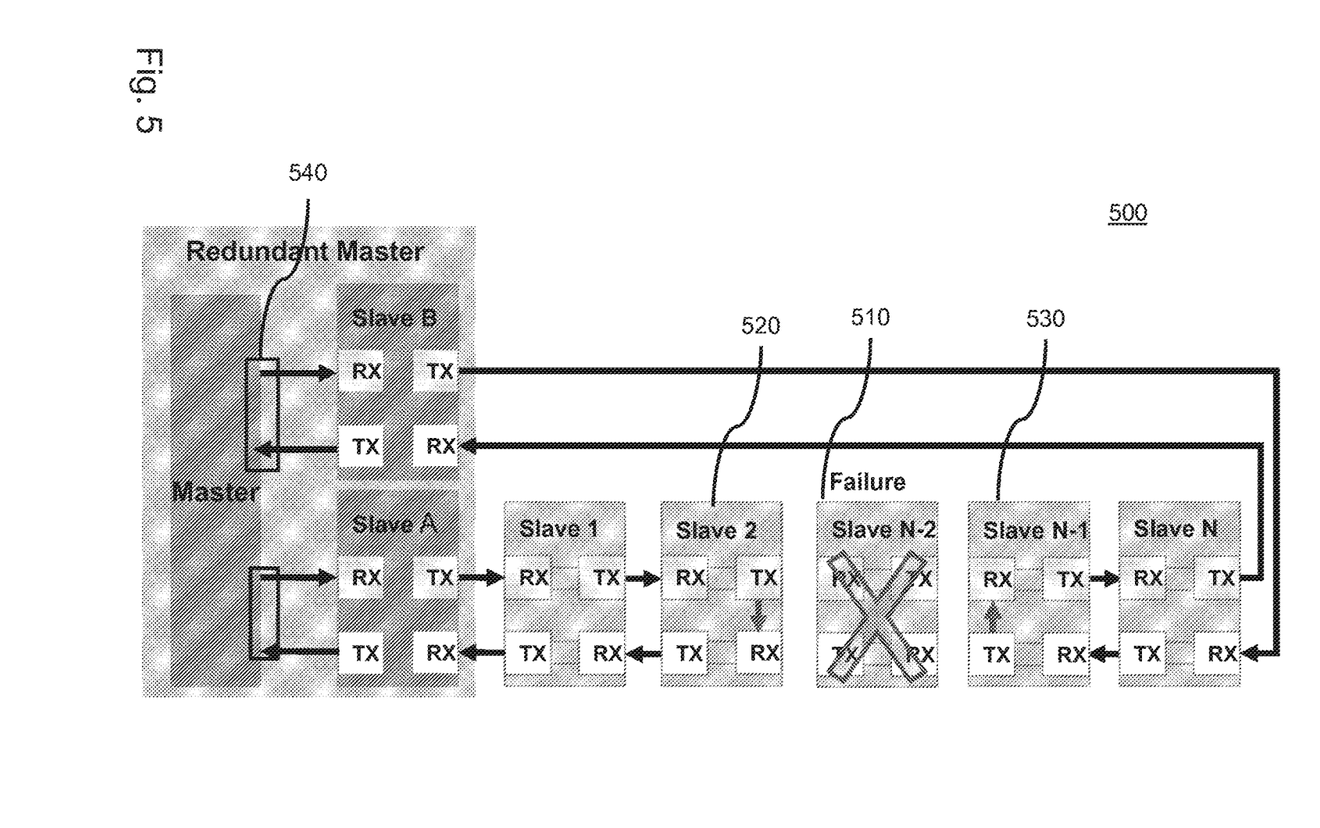
FIG. 5 shows an example of network having a redundant master and a switcher unit in transfer mode.

The slaves have a processing arrangement comprising a processing receiver coupled to a processing transmitter for receiving, processing and transmitting the data packets, and a forwarding arrangement comprising a forwarding receiver coupled to a forwarding transmitter for receiving, forwarding and transmitting the data packets, as described above with FIG. 1. In the slaves as depicted in FIGS. 4 and 5, the upper Rx-Tx pair constitutes the processing arrangement, and the lower Rx-Tx pair constitutes the forwarding arrangement.

The communication medium, as shown by directional arrows between the transmitter Tx and receiver Rx units, provides a respective connection from a processing transmitter of a respective slave in the sequence to a receiver of a slave adjacent to the respective slave in one direction in the sequence. Also, the communication medium provides a further respective connection from a forwarding transmitter of the respective slave to a receiver of a further slave adjacent to the respective slave in the other direction in the sequence.

It is noted, that the physical order in a chain may be different from the logical, which occurs when, in the chain, a processing transmitter is connected to a forwarding receiver, a so-called cross connection. For example, if a fourth slave in a chain of 5 has a crossed connection to slave 3, it will get logical position order number 5 while the terminating slave is logical number 4. The logical order indicates the order of the respective processing sections, while intermediate forwarding sections do not change the logical order. The terminating slave is not aware of his physical end location, if its forwarding RX is connected to his own processing TX. None of the slaves is aware of its sequence number.

The respective slave in the sequence is arranged for detecting whether the connection to the respective processing receiver is lost, and, if so, internally transferring any data packets from the forwarding arrangement to the processing arrangement, while setting the circulating bit. In practice, the circulating bit is set by a slave that detects loss of the link in its processing port, e.g. the processing port is disconnected by a user.

The electronic master device 400 has a switcher unit 420 coupled to the redundant slave port 460. The switcher unit has a switcher port, the switcher port having a switcher receiver Rx 422 and a switcher transmitter Tx 421, which are shown coupled to a last slave in the sequence 405, which is positioned at the end opposite to the slave port 450. It is noted that the switcher unit may be a separate device, but also may be embedded in the master device.

The device may further have an embedded slave 430 coupled between the slave port 450 and the first slave (Slave1) of the sequence. Having an embedded slave 430 at the slave port, and also implementing the switcher 420 in a second embedded slave port, enables distributed clock synchronization in both the terminating mode and the transfer mode, while the master clock may be shared with both embedded slaves.

The switcher unit has a processor for controlling the operational mode of the switcher. In a terminating mode, any data packets are internally transferred from the switcher receiver to the switcher transmitter. Furthermore, in data packets received on the switcher receiver, it is detected whether a circulating bit is set. If the circulating bit is detected to be set in a received packet, the mode of the switcher is changed from terminating mode to transfer mode.

FIG. 5 shows an example of network having a redundant master and a switcher unit in transfer mode. The Figure shows a network 500 after a failure of slave unit N-2 510 in the sequence, similar to the network of FIG. 4. For example, the power of slave unit N-2 has been interrupted, or the network cables have been disconnected. The failure is indicated by a cross in slave N-2.

When disconnect happens at the processing port of a slave N-1 530 following the disconnect location, a communication failure occurs. After the failure the subsequent slave N-1 530 is still operational, and will do two things. First the slave N-1 will perform a loopback from the forwarding arrangement to the processing port, as indicated by an upward arrow inside slave N-1. Secondly, the slave N-1 will set the circulating bit in all frames that it receives on its forwarding port.

It is noted that setting the circulating bit does not happen in slave 2 520 located in the sequence before the point of failure. Although slave 2 may detect loss of connection at its forwarding receiver, it will not set the circulating bit. It will forward packets to its forwarding receiver, as indicated by a downward arrow.

In the network 500, the switcher unit is shown as an embedded slave B in the redundant master device. Embedded slave B receives the circulating bit and reacts as described now. The embedded switcher unit is arranged for, when a circulating bit is detected to be set, to switch to a transfer mode. Said internally transferring is now stopped. In the transfer mode, a connection is switched on between the redundant slave port and the switcher receiver for transferring received packets to the redundant slave port, and between the redundant slave port and switcher transmitter for transferring said replicated packets to the sequence.

In the Figure, the embedded slave B is in the transfer mode, as shown by the arrows between the embedded slave B and the redundant slave port 540. In the example, slave N-1 has set the circulating bit thus causing slave B to establish the link to the master, i.e. switching from internal loopback to a functional link to the master.

On regular operation, as shown in FIG. 4, slave B forwarding port is closed, and incoming packets from the sequence are looped back. In fact a sequence is formed having Slave A as the first slave in the system and Slave B as the last slave. Both embedded slaves may be DC capable, and distributed clock synchronization is enabled for the full sequence. Updates of the synchronization may be performed at any time without changing the topology of the network. Only in the event of failure the topology is automatically changed to two subsequences, and synchronization may be performed for both subsequences.

The system automatically goes to redundant topology when a failure in one slave occurs. Slaves N-1 and N are connected via their forwarding port to the master. When slave B sees a datagram with its circulating bit set then the processing port is connected to the master and the master may be notified by an interrupt. The switcher unit may be arranged to provide the interrupt to the master device for signaling that an error has occurred in the sequence. Optionally, the switcher unit is arranged to provide the interrupt to the master device for signaling that switching to the transfer mode is to occur, and/or specifically indicating when the master has to start providing packets on the redundant slave port, e.g. by replicating packets from the slave port.

In redundant mode the master duplicates each EtherCAT packet and sends them to both slave 1 and slave N. This enables the master to stay connected to all the slaves except slave N-2, which has failed. Now the system has Slave A and B as the first DC capable slave in each sub system. Hence system failure is automatically detected using the circulating bit. Next the topology is automatically changed by a switcher or enhanced slave when a failure is detected.

Optionally, the master may be notified of the failure by the switcher unit using an interrupt. The automatic switching scheme will ensure that the network performs a smooth and synchronized transition from the normal system operating mode to the redundant mode when a failure occurs. A regular redundant master will only know there is a problem in the system when not all the slaves reply its requests. In the current solution the master will also be notified by the link establishment by slave B. However, additionally providing an interrupt to the master may improve the response time to a network failure.

Optionally, the master may be notified of the error thus eliminating the need to verify the connection. Verification would require use of a broadcast packet, read the working counter and verify it. The switcher functionality will also simplify the master implementation and reduce the data rate in the network. Effectively, the method reduces the required processing power and the design effort needed to support a synchronized redundancy topology on an EtherCAT master.

In a practical test embedded slaves were simulated using two internally added circuit boards; the four other slaves in the sequence were standard EtherCAT slaves. The internal slaves were connected to the master using two different Ethernet ports. In the test a "fail state" was enforced by disconnecting the cable between the third and fourth slave to simulate an error. Before the connection failure, the first embedded slave, and the four external slaves, and finally the second embedded slave were discovered by the master, on a path called path A. A second, redundant port of the master did not discover any devices at its path B. After the connection failure all slaves were still visible to the master; path A now had the first embedded slave and external slaves 1-3, whereas in path B the other embedded slave and slave number four were discovered by the master.

Figure 6:
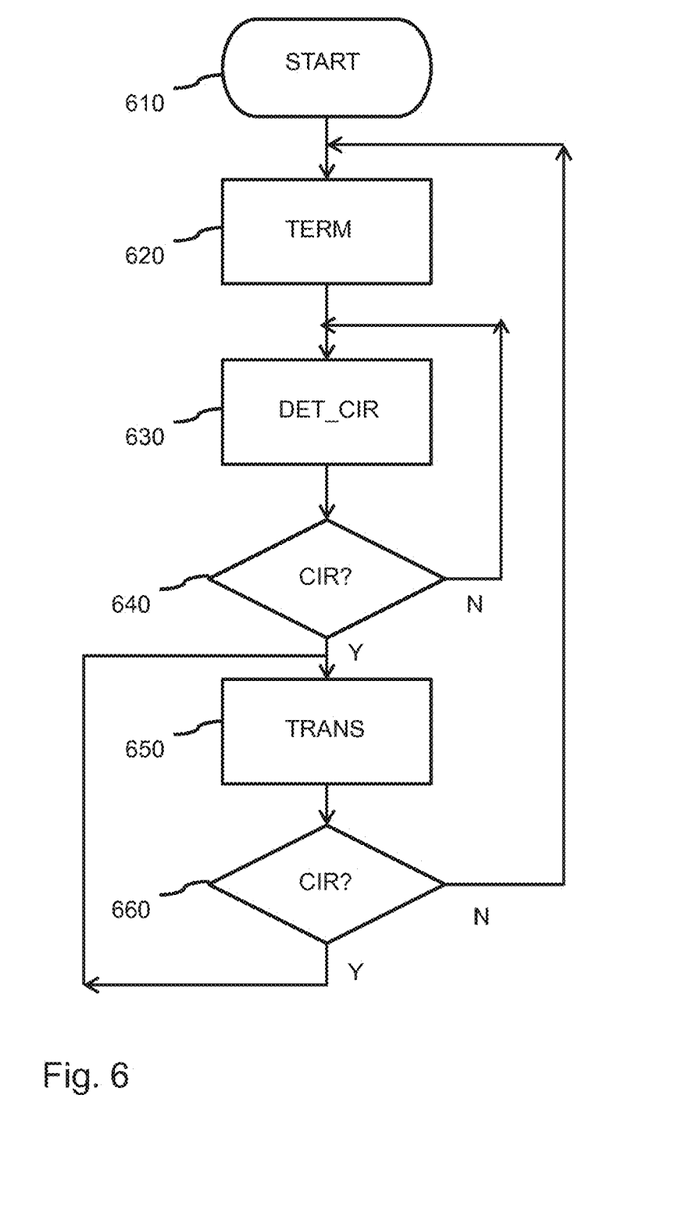
FIG. 6 shows an example of a method of transferring packets in a network.

FIG. 6 shows an example of a method of transferring packets in a network. The network has an electronic master device and slave devices as described above with reference to FIG. 1. In the network, the electronic master device is provided with a switcher unit coupled to the redundant slave port and having a switcher port, the switcher port having a switcher receiver and a switcher transmitter to be coupled to a last slave in the sequence positioned at the end opposite to the slave port. The switcher is controlled by the method as follows.

Initially, at start 610, the system is configured and the switcher is set up. In a next step TERM 620, the control method activates a terminating mode. In the terminating mode, the switcher is controlled to internally transfer any data packets from the switcher receiver to the switcher transmitter. In a next step DET_CIR 630 the circulating bit is retrieved from incoming data packets from the sequence, i.e. in data packets received on the switcher receiver. In a next step CIR? 640 the value of the circulating bit is tested, i.e. whether the circulating bit is set. If not, the mode is not changed and the method reverts to step DET_CIR until the next packet arrives.

However, if the circulating bit is set, the mode is changed in next step TRANS 650. In the transfer mode said internally transferring of data packets is switched off, and a connection between the redundant slave port and the switcher receiver is switched on for transferring received packets to the redundant slave port, and between the redundant slave port and switcher transmitter for transferring said replicated packets to the sequence. The mode may remain unchanged until a system reset or a manual reset.

Optionally, a further test may be performed on the circulating bit in step CIR? 660. As long as the circulating bit remains set in new arriving packets, the transfer mode is maintained. If the circulating bit is not set any more, the system may assume that the failure has been remedied, e.g. a hot plug-in has been performed by adding a slave in the sequence. Now the system automatically detects that normal connections are available, and the switcher is controlled to activate the terminating mode.

In summary, the system automatically switches the topology to divide a sequence of slaves into two separate subsequences, when a failure or cable disconnection occurs. When the connection between all slaves in a sequence is restored, the system may revert the topology to a single sequence.

Optionally, the method may provide distributed clock synchronization for synchronizing respective networking clocks in respective slave and master devices in the network. Furthermore, the method may include providing said distributed clock synchronization in a single sequence of slaves during terminating mode, and providing said distributed clock synchronization in a two separate sub-sequences of slaves during transfer mode.

The above method may be implemented in a switcher, a master device or dedicated slave device, e.g. in programmable hardware. Also, the method may be implemented in software for, when executed on a processor, controlling any switching elements to perform the switching of the topology of the network as described.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be an type of connection suitable to transfer signals from or to the respective nodes, units or devices, for example via intermediate devices. Accordingly, unless implied or stated otherwise the connections may for example be direct connections or indirect connections.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device.

Furthermore, the units and circuits may be suitably combined in one or more semiconductor devices.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An electronic master device, the device comprising a master unit having a slave port and a redundant slave port for communicating with slaves according to a network protocol,
   the network protocol defining data packets comprising data bytes having a predetermined structure including a circulating bit,
   the slaves being arranged for connection via a communication medium in a sequence starting at a slave port of a master device,
   the redundant slave port being arranged for replicating packets transferred via the slave port,
   a respective slave having processing arrangement comprising a processing receiver coupled to a processing transmitter for receiving, processing and transmitting the data packets, and a forwarding arrangement comprising a forwarding receiver coupled to a forwarding transmitter for receiving, forwarding and transmitting the data packets,
   the communication medium providing a respective connection from a processing transmitter of a respective slave in the sequence to a receiver of a slave adjacent to the respective slave in one direction in the sequence, and the communication medium providing a further respective connection from a forwarding transmitter of the respective slave to a receiver of a further slave adjacent to the respective slave in the other direction in the sequence,
   the respective slave in the sequence being arranged for detecting whether the connection to the respective processing receiver is lost, and, if so, internally transferring any data packets from the forwarding arrangement to the processing arrangement, while setting the circulating bit,
   the electronic master device being provided with a switcher unit coupled to the redundant slave port and having a switcher port, the switcher port having a switcher receiver and a switcher transmitter to be coupled to a last slave in the sequence positioned at the end opposite to the slave port, the switcher unit being arranged for in a terminating mode, internally transferring any data packets from the switcher receiver to the switcher transmitter, and
   providing distributed clock synchronization for synchronizing respective networking clocks in respective slave and master devices in the network in a single sequence of slaves during terminating mode;
   providing said distributed clock synchronization in two separate sub-sequences of slaves during transfer mode;
   detecting, in a data packet received on the switcher receiver, whether a circulating bit is set, and if so,
   switching to a transfer mode by switching off said internally transferring and
   switching on a connection between the redundant slave port and the switcher receiver for transferring received packets to the redundant slave port, and between the redundant slave port and switcher transmitter for transferring said replicated packets to the sequence.

2. Device as claimed in claim 1, wherein the switcher unit is an embedded slave unit coupled between the redundant port and the last slave in the sequence, adapted to perform said transferring, detecting and switching.

3. Device as claimed in claim 1, comprising a further embedded slave unit coupled between the slave port and a first slave in the sequence positioned at the end opposite to the switcher unit.

4. Device as claimed in claim 2, wherein the embedded slave unit is capable to provide distributed clock synchronization for synchronizing respective networking clocks in respective slave and master devices in the network.

5. Device as claimed in claim 1, wherein the switcher unit is arranged to provide an interrupt to the master device for signaling that an error has occurred in the sequence.

6. Device as claimed in claim 5, wherein the switcher unit is arranged to provide the interrupt to the master device for signaling that switching to the transfer mode is to occur.

7. Switcher device for cooperating with a master device as claimed claim 1.

8. Switcher device as claimed in claim 7, wherein the switcher device is a slave node device.

9. Switcher device as claimed in claim 7, wherein the switcher device is arranged to provide an interrupt to the master device for signaling that an error has occurred in the sequence.

10. The device as claimed in claim 1, wherein the network protocol is EtherCAT.

11. An integrated circuit comprising at least one electronic device according to claim 1.

12. Method of transferring packets in a network, the network comprising an electronic master device, the device comprising a master unit having a slave port and a redundant slave port for communicating with slaves according to a network protocol, the network protocol defining data packets comprising data bytes having a predetermined structure including a circulating bit, the slaves being arranged for connection via a communication medium in a sequence starting at a slave port of a master device, the redundant slave port being arranged for replicating packets transferred via the slave port, a respective slave having processing arrangement comprising a processing receiver coupled to a processing transmitter for receiving, processing and transmitting the data packets, and a forwarding arrangement comprising a forwarding receiver coupled to a forwarding transmitter for receiving, forwarding and transmitting the data packets, the communication medium providing a respective connection from a processing transmitter of a respective slave in the sequence to a receiver of a slave adjacent to the respective slave in one direction in the sequence, and the communication medium providing a further respective connection from a forwarding transmitter of the respective slave to a receiver of a further slave adjacent to the respective slave in the other direction in the sequence, the respective slave in the sequence being arranged for detecting whether the connection to the respective processing receiver is lost, and, if so, internally transferring any data packets from the forwarding arrangement to the processing arrangement, while setting the circulating bit, the electronic master device being provided with a switcher unit coupled to the redundant slave port and having a switcher port, the switcher port having a switcher receiver and a switcher transmitter to be coupled to a last slave in the sequence positioned at the end opposite to the slave port, the method comprising:

in a terminating mode, internally transferring, by the switcher port, any data packets from the switcher receiver to the switcher transmitter, and providing distributed clock synchronization for synchronizing respective networking clocks in respective slave and master devices in the network in a single sequence of slaves during terminating mode;

providing said distributed clock synchronization in two separate sub-sequences of slaves during transfer mode;

detecting, by the switcher port in a data packet received on the switcher receiver, whether a circulating bit is set, and if so, switching, by the switcher port, to a transfer mode by switching off said internally transferring; and switching, by the switcher port, on a connection between the redundant slave port and the switcher receiver for transferring received packets to the redundant slave port, and between the redundant slave port and switcher transmitter for transferring said replicated packets to the sequence.

13. Method as claimed in claim 12, comprising providing an interrupt to the master device for signaling that an error has occurred in the sequence.

14. Method as claimed in claim 13, comprising providing the interrupt to the master device for signaling that switching to the transfer mode is to occur.

* * * * *